United States Patent [19]

Schweitzer et al.

[11] 3,868,479

[45] Feb. 25, 1975

[54] TELEPHONIC ALARM REPORTING APPARATUS

[75] Inventors: John C. Schweitzer; Terry E. Tuttle, both of Grand Junction, Colo.

[73] Assignee: Delta Products, Inc., Grand Junction, Colo.

[22] Filed: Oct. 30, 1972

[21] Appl. No.: 301,717

[52] U.S. Cl. .......... 179/5 R

[51] Int. Cl. .......... H04m 11/04

[58] Field of Search .......... 179/5 R, 2 A, 90 R, 90 B, 179/90 AD

[56] References Cited

UNITED STATES PATENTS

| | | | |
|---|---|---|---|
| 2,768,238 | 10/1956 | Risinger | 179/5 R |
| 3,288,933 | 11/1966 | Beeston | 179/5 R |
| 3,304,547 | 2/1967 | Bristol | 179/5 R |
| 3,492,426 | 1/1970 | Foreman | 179/5 R |
| 3,505,476 | 4/1970 | Kelly | 179/5 R |
| 3,515,815 | 6/1970 | Baynard | 179/90 B |
| 3,549,810 | 12/1970 | Driscoll | 179/90 B |
| 3,582,555 | 6/1971 | Kok | 179/90 R |
| 3,700,813 | 10/1972 | Colman | 179/90 B |
| 3,702,902 | 11/1972 | Willis | 179/5 R |

*Primary Examiner*—William C. Cooper
*Assistant Examiner*—C. T. Bartz
*Attorney, Agent, or Firm*—Edwards, Spangler, Wymore & Klaas

[57] ABSTRACT

Apparatus for reporting the occurrence of an event by placing a telephone call includes circuitry which activates the apparatus in response to a trigger signal, dialing circuitry, and circuitry for generating and transmitting a coded alarm signal. The apparatus has a self-contained power supply and is arranged to redial if the telephone number called is busy. Audio amplification circuitry is disclosed which is selectively enabled to provide an audio surveillance feature and the apparatus operates to automatically deactivate itself.

15 Claims, 5 Drawing Figures

TELEPHONIC ALARM REPORTING APPARATUS

The present invention relates to apparatus for reporting the occurrence of an alarm condition or other selected event by automatically placing a telephone call to a selected telephone number.

The alarm conditionor other selected event reported may, for example, be the breaking and entering of a building, the unauthorized intrusion into a protected area, a signal from a bank teller indicating that a robbery is in process, a malfunction in an industrial process, a signal fron an invalid or child indicating that help is needed, the presence of smoke or heat indicating fire, etc.

Heretofore, telephonic alarm reporting devices have been contrived. These devices however, have generally been cumbersome, expensive and/or unduly complicated.

For example, many of the prior art alarm reporting devices have included complicated and cumbersome mechanical mechanisms for lifting the receiver of a telephone set and then mechanically dialing the selected telephone number being called. The inclusion of such lifting and mechanical dialing mechanism in an alarm reporting device is undersirable for several reasons. Firstly, the mechanism may interfere with the regular use of the telephone and may be unsightly. Secondly, since the mechanism is in plain view, a burglar is alerted to the fact that an alarm call is being made and may be able to stop or disengage the mechanism before the call has been completed. Further, such mechanical lifting and dialing mechanisms may prove to be unreliable.

Other prior art alarm reporting devices have included tape deck mechanism for playing a tape having an emergency message or messages recorded thereon. Unfortunately, the mechanism for controlling the operation of the tape deck was generally complicated. Further, a burglar could stop an emergency message from being sent by removing the tape.

It is, accordingly, an object of the present invention to provide an improved telephonic alarm reporting apparatus characterized by being reliable in operation and simple and inexpensive in construction.

It is also an object of the present invention to provide an improved telephonic alarm reporting apparatus capable of transmitting to a remote telephone called a readily identifiable coded alarm signal.

It is further an object of the present invention to provide an improved telephonic alarm reporting apparatus which may be preset to dial when triggered a selected telephone number and which may also be preset to output a selected coded alarm signal.

It is additionally an object of the present invention to provide an improved telephonic alarm reporting apparatus which is operable to automatically redial a telephone number being called whenever a busy signal is received.

It is another object of the present invention to provide an improved telephonic alarm reporting apparatus which is operable to complete its dialing sequence once triggered by an alarm condition even though the supply of power thereto is interrupted and/or its trigger lines are open circuited.

It is still another object of the present invention to provide an improved telephonic alarm reporting apparatus characterized by having a self-contained power supply and a microphone arrangement which is enabled for a predetermined time period after a telephone number has been dialed either for the purpose of providing audio surveillance of the region where the alarm condition has occurred or for the purpose of transmitting other selected information to the telephone set which has been called.

It is yet another object of the present invention to provide an improved telephonic alarm reporting apparatus characterized by being enabled and disabled by selectively controlling the application of supply voltage to its circuitry.

In accomplishing these and other objects, there is provided in accordance with the present invention apparatus for reporting the occurrence of an alarm condition or other selected event by automatically placing a telephone call to a selected telephone number. The apparatus preferably has a self-contained power supply and includes circuity which activates the apparatus in response to a trigger signal representing the occurrence of the alarm condition or other selected event being monitored. Circuitry is included in the apparatus which operates once activated to dial a selected telephone number, generate and transmit a selected coded alarm signal to the telephone set at the telephone number call and then selectively deactivate the apparatus once the alarm signal has been transmitted. Circuitry also is preferably included in the apparatus for automatically replacing the telephone call if a busy signal is received. Audio amplification circuitry may be included which is enabled after the telephone number has been dialed for the purpose of providing audio surveillance of the region where the alarm condition has occurred or for the purpose of transmitting other selected information to the telephone set called.

Additional objects of the present invention reside in the specific construction of the telephonic alarm reporting apparatus hereinafter particularly described in the specification and shown in the several drawings.

Figure 1:
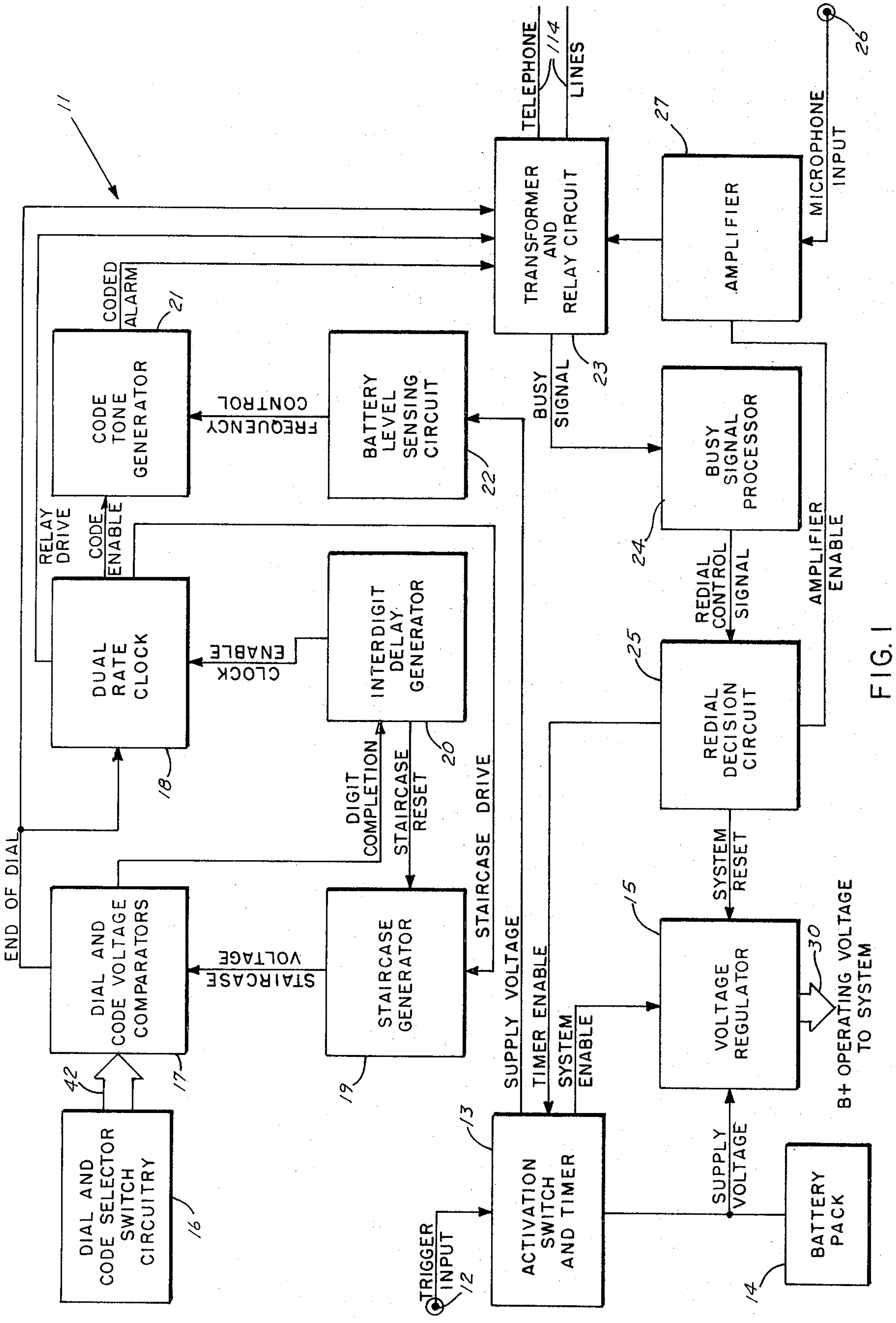
FIG. 1 is a block diagram of a telephonic alarm apparatus according to the present invention.

Referring to the drawings in more detail, there is shown in FIG. 1 an alarm reporting apparatus generally designated by the numeral 11. The apparatus 11 is made up of the following components: a trigger input jack 12; an activation switch and timer circuit 13; a battery pack 14; a voltage regulator circuit 15; dial and code selector switch circuitry 16; dial and code voltage comparators 17; a dual rate clock circuit 18; a staircase voltage generator 19; an interdigit delay generator 20; a code tone generator 21; a battery level sensing circuit 22; a transformer and relay circuit 23; a busy signal processor 24; a redial decision circuit 25; a microphone input jack 26; and an amplifier 27.

The battery pack 14 provides a self-contained DC supply voltage source for the apparatus 11. As shown in FIG. 1, the battery 14 supplies the voltage signal designated SUPPLY VOLTAGE to the activation switch and timer circuit 13 and the voltage regulator 15. A suitable SUPPLY VOLTAGE signal is positive 27 volts and may be provided by connecting three 9 volt batteries in series.

The activation switch and timer circuit 13 is connected to receive a TRIGGER INPUT signal from the input terminal 12 and a TIMER ENABLE signal from the redial decision circuit 25. In response to the TRIGGER INPUT signal, the circuit 13 is switched to and latched in an activated state. In its activated state, the circuit 13 transmits a SYSTEM ENABLE signal to the voltage regulator 15 and the SUPPLY VOLTAGE signal to the battery level sensing circuit 22. In response to the TIMER ENABLE signal, the circuit 13 switches after a predetermined built-in time delay to a deactivated state. In its deactivated state, the circuit 13 does not generate the outputs SYSTEM ENABLE and SUPPLY VOLTAGE.

The circuit 13 may be of any suitable conventional type. For example, the circuit 13 may include an SCR switch which is latched to activate the system whenever a short circuit is placed across the trigger input jack 12 and a timer which operates in response to the TIME ENABLE signal to generate a time period of a predetermined length, such as 90 seconds, and then deactivates the system by generating a signal to unlatch the SCR switch. Further, the outputs SYSTEM ENABLE and SUPPLY VOLTAGE may be generated by the circuit 13 by retransmitting the SUPPLY VOLTAGE signal received from the battery 14.

The voltage regulator 15 is connected to receive the SYSTEM ENABLE signal from the activation switch and timer circuit 13 and a SYSTEM RESET signal from the redial decision circuit 25. The voltage regulator 15 is also connected to the circuits designated by the numerals 16-25 and 27 for supplying operating or bias voltage thereto. The operating voltage is designated B+ and may be, for example, positive 12 volts. The connection of the voltage regulator 15 to the circuits 16-25 and 27 is indicated generally in FIG. 1 by the arrow 30.

The voltage regulator 15 is enabled by the SYSTEM ENABLE signal and operates in a conventional manner when enabled to generate and output the voltage B+ to the circuits 16-25 and 27. The generator 15 generates the B+ voltage from the SUPPLY VOLTAGE signal received from the battery 14. In response to the control signal SYSTEM RESET, the operating voltage B+ is momentarily driven by the regulator circuit 15 to approximately zero volts to reset the apparatus 11 for redialing the telephone number being called.

Figure 2:
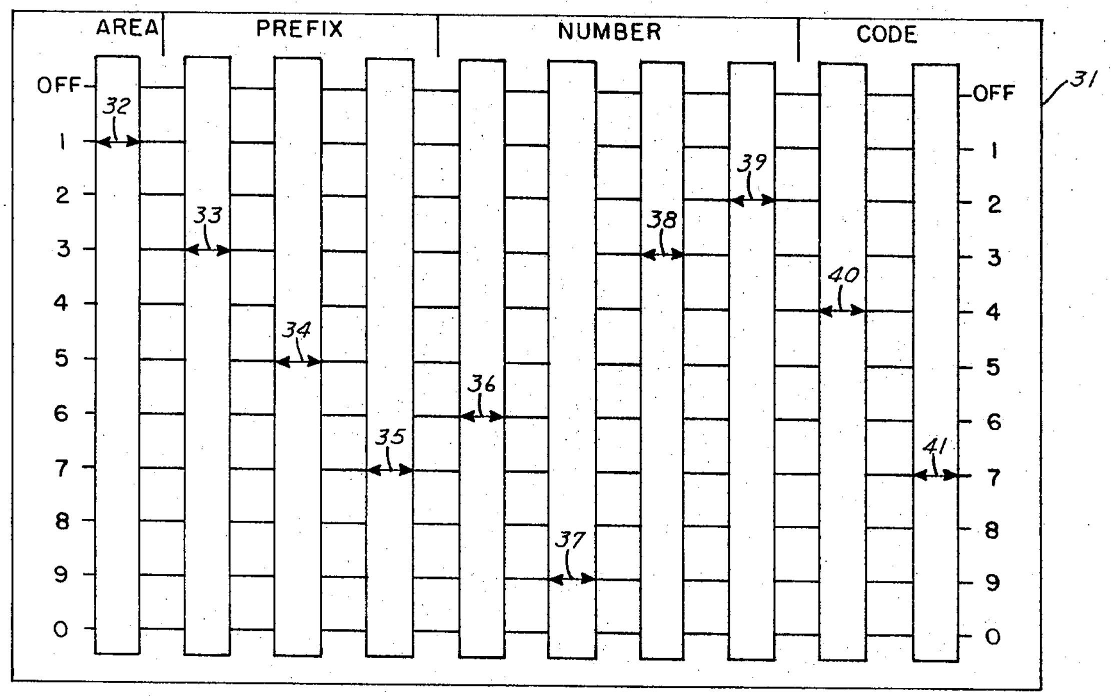
FIG. 2 is a view of the switchboard of the dial and code selector switch circuitry of FIG. 1.

A switchboard 31 of the dial and code selector switch circuity 16 is shown in FIG. 2. A plurality of manually positionable selector switches designated 32-41 are mounted on the switchboard 31. The selector switches 32-41 form part of a matrix switch in the circuit 16 and control linear voltage divider means included therein. Each of the selector switches 32-41 may be selectively set in any of eleven positions designated sequentially OFF 1-9, and 0 to set a plurality of DC voltages corresponding and linearly proportional to the selector switch positions into the dial and code voltage comparators 17. The DC voltage corresponding to selector switch position OFF is a set at a predetermined level. The DC voltages corresponding to selector switch positions 1-0 increase sequentially in equal voltage steps or increments from the predetermined OFF voltage level.

The plurality of DC voltages set into the comparators 17 by the circuitry 16 is identified in FIG. 1 generally by the arrow 42 and represent the telephone number to be called and the coded alarm signal to be outputted by the alarm reporting apparatus 11.

The selector switches 32-41 are illustrated in FIG. 2 set for dialing the number 1-357-6932 and generating the coded alarm signal 47. As indicated on the face of the switchboard 31, the selector switches 32, 33-35, and 36-39 are for setting, respectively, the area code (local or toll call), the prefix, and the last four digits of the subject telephone number, and the selector switches 40-41 are for setting the coded alarm signal.

Figure 3:
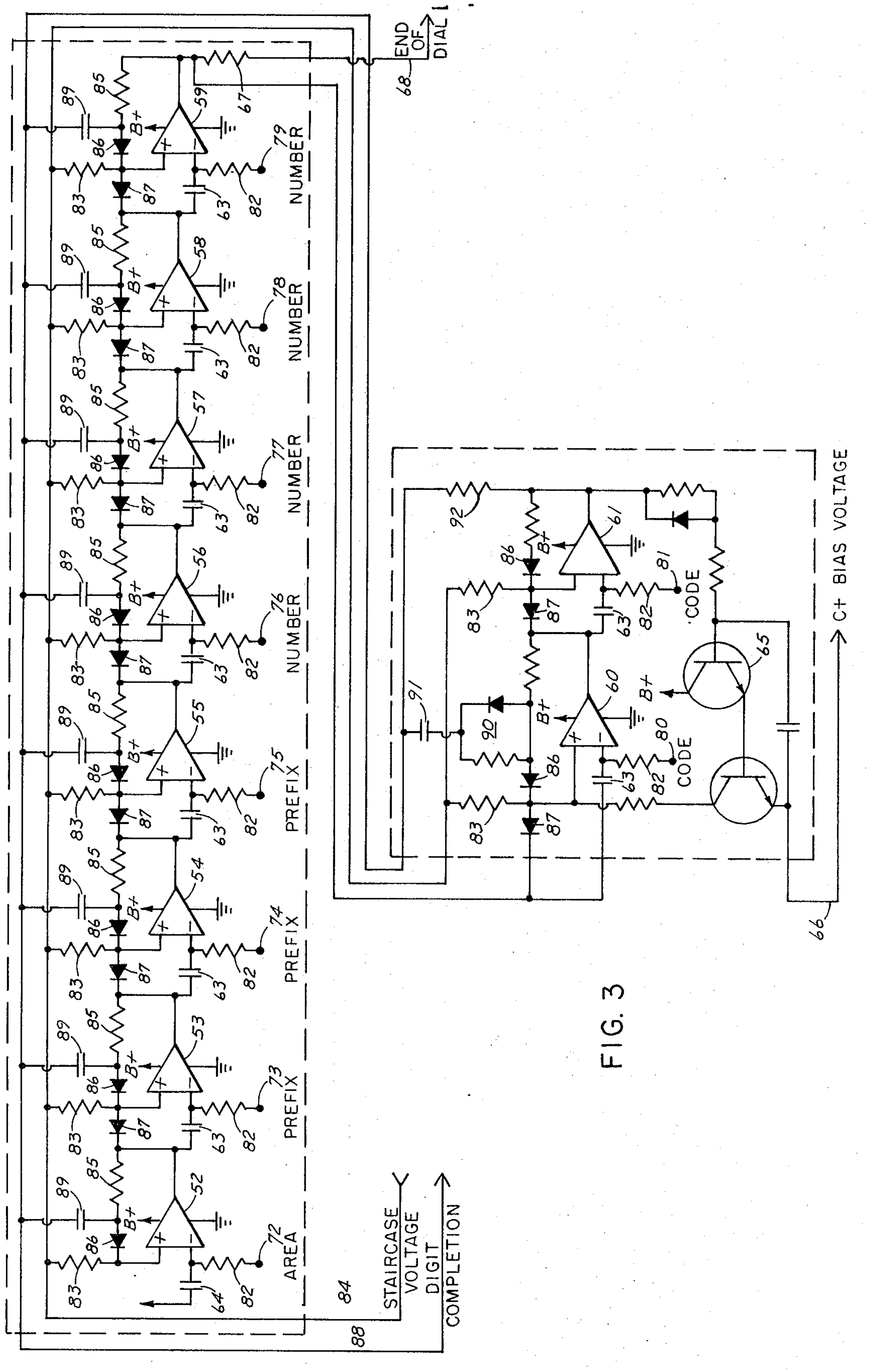
FIG. 3 is a circuit diagram of the dial and code voltage comparators of FIG. 1.

The circuitry making up the dial and code voltage comparators 17 is shown in FIG. 3. The circuitry 17 includes a plurality of operational amplifiers which correspond in number to the plurality of selector switches 32-41. The operational amplifiers are designated by the numerals 52-61 and each amplifier has an inverting input terminal indicated by a minus (−), a noninverting input terminal indicated by a plus (+) and an output terminal.

The amplifiers 52-61 care connected to form an amplifier chain or string with the output terminal of one connected through a capacitor 63 to the inverting input terminal of the next numerical sequence. The first amplifier 52 in the amplifier chain has B+ voltage applied to its inverting terminal through a capacitor 64. The last amplifier 61 in the chain has its output terminal connected back to the noninverting terminal of the amplifier 60 through a recycling loop made up of a transistor pair 65. C+ bias voltage is applied to the transistor pair 65 on the voltage bus 66. Connected to the output terminal of the amplifier 59 through a resistor 67 is a voltage bus 68 upon which is generated an END OF DIAL signal.

Connected to the inverting terminals of the amplifiers 52-61 are input terminals 72-81, respectively. Each of the input terminals 72-81 is connected to its associated inverting terminals through a resistor 82. The terminals 72-81 are connected to receive from the circuitry 16 the DC voltages corresponding to the positions of the selector switches 32-41, respectively. Accordingly, the terminals 72, 73-75, 76-79 and 80-81 are labeled in FIG. 3 AREA, PREFIX, NUMBER and CODE, respectively.

Each of the noninverting terminals of the amplifiers 52-61 is connected through a resistor 83 to a voltage bus 84. The voltage bus 84 is connected to receive a STAIRCASE VOLTAGE signal from the staircase generator 19. A resistor 85- diode 86 combination is connected between the output and noninverting terminals of each of the amplifiers 52-61 to provide a feedback path for each amplifier. An enabling diode 87 is tied between the output terminal of each operational amplifier and the noninverting input of the next operational amplifier in the amplifier chain.

A voltage bus 88 upon which is generated a DIGIT COMPLETION signal is connected to the outputs of each of the amplifiers 52-59 through capacitors 89. Each capacitor 89 is connected from its associated junction of the resistor 85 with the diode 86 to the bus 88. The amplifier 60 has its output connected to the bus 88 through a parallel connected diode-resistor combination 90 which is connected in series with a capacitor 91. The diode-resistor combination 90 is connected between the junction of the associated resistor 85 and diode 86, and the capacitor 91 is tied to the bus 88. The output of the amplifier 61 is connected to the bus 88 through a resistor 92. The operational amplifiers 52-61 operate as voltage comparators in the circuitry 17 for sequentially comparing the DC voltages representing the positions of the selector switches in the circuitry 16 with the STAIRCASE VOLTAGE signals being generated by the staircase generator 19. Their operation as such is hereinafter described in conjunction with the description of the overall operations of the alarm reporting apparatus 11. The circuitry generates, as above mentioned, the output signals DIGIT COMPLETION and END OF DIAL. The DIGIT COMPLETION signal is transmitted to the interdigit delay generator 20 and functions to signal the generator 20 that a telephone number digit has been dialed or a code digit has been outputted. The END OF DIAL signal is transmitted to the dual rate clock 18 and the transformer and relay circuit 23 to indicate that the dialing of telephone number being called has been completed.

The interdigit delay generator 20 is connected to receive the DIGIT COMPLETION signal from the comparators 17 and to transmit a CLOCK ENABLE signal and a STAIRCASE RESET signal to, respectively, the clock 18 and the staircase generator 19. The delay generator 20 has an activated state in which it generates a delay of a selected length of time and a deactivated state in which no time delay is being generated. In its activated state, the generator 20 generates the STAIRCASE RESET signal to reset the staircase generator 19. In its deactivated state, the generator 20 outputs the CLOCK ENABLE signal to enable the clock 18.

In operation, the delay generator 20 is activated by the DIGIT COMPLETION signal to simultaneously stop the clock 18 and reset the staircase generator 19. The activated generator 20 then generates a time delay of a selected length. At the end of the time delay, the generator 20 automatically switches to its deactivated state to start the clock 18 and remove the STAIRCASE RESET signal from the staircase generator 19.

It is noted that any suitable time delay generating circuit may be used for the delay generator 20, such as an appropriately connected operational amplifier. Further, the output of such an operational amplifier could be used for both the signals STAIRCASE RESET and CLOCK ENABLE with the high state of the operational amplifier representing one of the signals and its low state the other.

The clock 18 is a dual rate clock which is selectively operable to generate clock pulses at first and second rates, such as ten and two pulses per second. The ten pulse per second rate is used for establishing the telephone number dialing rate while the two pulse per second rate is used in connection with the outputting of the coded alarm signal.

The clock 18 is enabled by the CLOCK ENABLE signal received from the delay generator 20 and when enabled generates clock pulses in the form of a STAIRCASE DRIVE voltage at either its first or second rate. The clock 18 is connected to receive the END OF DIAL signal from the comparators 17. In response to the END OF DIAL signal, the clock 18 switches from operating at its first rate to its second rate. When operating at its first rate, the clock 18 transmits a ten pulse per second RELAY DRIVE signal to the transformer and relay circuit 23 to dial the telephone number being called by the apparatus 11. When operating at its second rate, the clock 18 transmits a two pulse per second CODE ENABLE signal to enable the code tone generator 21.

Figure 4:
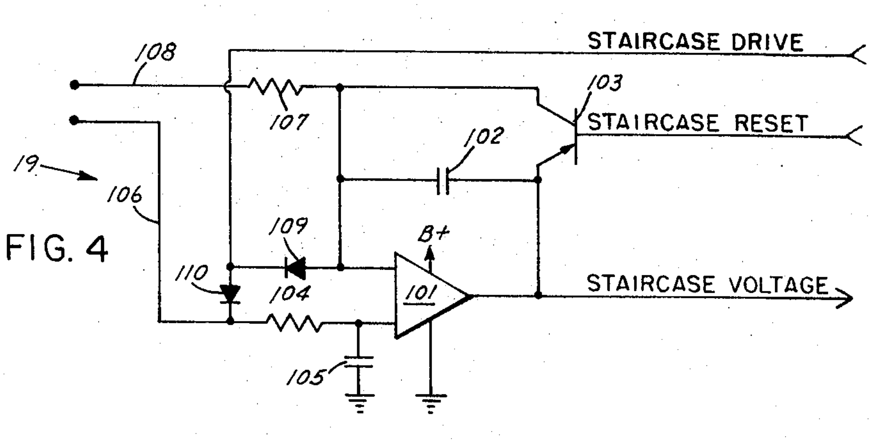
FIG. 4 is a circuit diagram of the staircase generator FIG. 1.

The staircase generator 19 is connected to receive the STAIRCASE RESET signal from the delay generator 20, to receive the STAIRCASE DRIVE signal from the clock 18, and to transmit the STAIRCASE VOLTAGE signal to the comparators 17. The circuitry of the generator 19 is shown in FIG. 4 and includes an operational amplifier 101, a feedback capacitor 102, and a transistor 103.

The circuit 19 uses the operational amplifier 101 which is of high gain to achieve linearity and stability. The feedback capacitor 102 is initially discharged by the STAIRCASE RESET signal applied to the base of the transistor 103 so that the STAIRCASE VOLTAGE signal generated on the output of the amplifier 101 is at the first reference voltage applied to the inverting (−) amplifier input terminal. This first reference voltage is applied to the inverting amplifier input terminal on voltage bus 106 through resistor 104 and is stored on input capacitor 105. It is noted that the first reference voltage applied to the bus 106 is set to slightly exceed the OFF voltage of the selector switches 32-41 for reasons hereinafter explained.

Applied to the noninverting (+) terminal of the amplifier 101 through a resistor 107 and on a voltage bus 108 is a second reference voltage. The second reference voltage exceeds the first reference voltage by an amount or increment equal to the voltage step between sequential positions of the selector switches 32-41.

In operation of the circuit 19 when the STAIRCASE DRIVE signal from the clock 18 goes high, the diode 109 and 110 conduct to charge the input capacitor 105 to the level of the second reference voltage on the bus 108. When the STAIRCASE DRIVE signal next goes low, the capacitor 105 discharges down to the first voltage level on the bus 106 and this charge from the capacitor 105 charges and is stored on the feedback capacitor 102. Thus, the output voltage of the amplifier 101 increases in voltage steps equal to the voltage difference between the buses 106 and 108 as the clock 18 switches between its high and low states. Thereby, a STAIRCASE VOLTAGE signal is generated which has voltage steps equal to the voltage steps between sequential positions of the selector switches 32-41. It is noted that a STAIRCASE VOLTAGE signal having a specific number of steps may exceed the DC voltage signal associated with the corresponding numerical selector switch position since the reference voltage level at which the STAIRCASE VOLTAGE level commences may be set to be slightly higher than the OFF selector switch voltage level.

Figure 5:
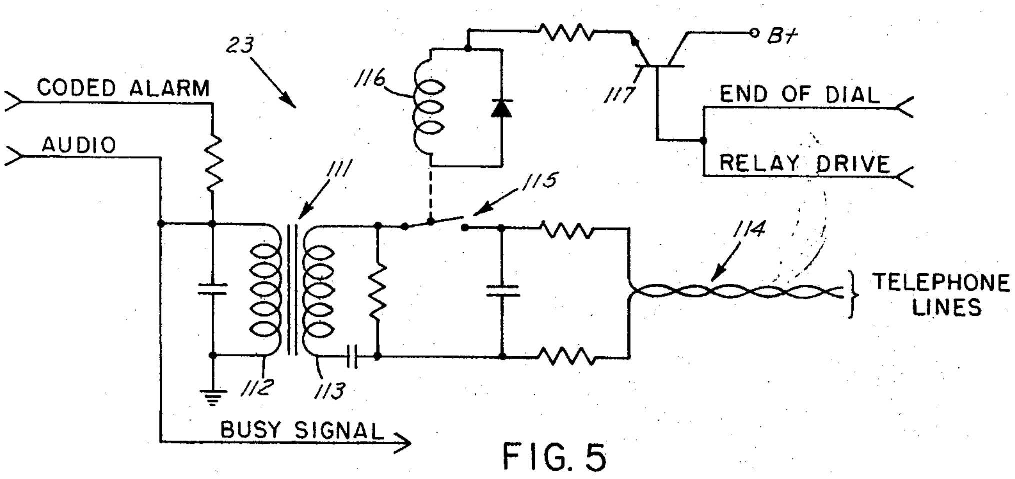
FIG. 5 is a circuit diagram of the transformer and relay circuit of FIG. 1.

The circuitry of the transformer and relay circuit 23 is shown in FIG. 5. The circuit 23 includes a voltage transformer 111 having a primary coil 112 and a secondary coil 113. The primary coil 112 is connected to receive a CODED ALARM signal from the code tone generator 21 and an AUDIO signal from the amplifier 27. The secondary coil 113 has a pair of telephone lines 114 connected thereacross through a set of relay contacts 115. The telephone lines 114 extend to a standard telephone switchboard not shown. The primary coil 112 is also connected to transmit to the busy signal processor 24 a BUSY SIGNAL received from the telephone lines 114 via the transformer 111. The set of relay contacts 115 is closed and opened, respectively, by energizing and deenergizing a relay coil 116. The coil 116 is driven by a relay driver formed by a transistor 117. The base electrode of the transistor 117 is connected to receive the RELAY DRIVE signal from the clock 18 and the END OF DIAL signal from the comparators 17.

In operation of the circuit 23, the RELAY DRIVE signal functions to open and close the relay contacts 115 to dial a telephone number over the telephone lines 114 and the END OF DIAL signal operates to latch the relay contacts 115 closed once the telephone number has been dialed. With the relay contacts 115 latched closed, the CODED ALARM signal may be transmitted via the transformer 111 over the telephone lines 114 to the telephone set called. Also, with the contacts 115 latched closed, a BUSY SIGNAL received from the telephone number called is transmitted to the processor 24. Latching the contacts 115 closed additionally connects the telephone lines 114 to the amplifier 27. Thus, when the amplifier 27 is enabled, any AUDIO output signal therefrom is transmitted over the telephone lines 114 to the telephone set called.

The code tone generator 21 is a relaxation oscillator which is preferably formed by a unijunction transistor. The generator 21 operates to generate an audio tone at a selected audio frequency and is connected to receive the two pulse per second CODE ENABLE signal from the clock 18. The CODE ENABLE signal operates to switch the generator 21 on and off in time phase with the code generated by the comparators defined by the operational amplifiers 60 and 61 in the circuitry 17. Thereby, an audio tone coded at a two pulse per second rate for ease in code recognition is outputted by the code tone generator 21 as the signal CODED ALARM.

The code generator 21 is also connected to receive a FREQUENCY CONTROL signal from the battery level sensing circuit 22. The circuit 22 receives the SUPPLY VOLTAGE signal from the battery 14 through the circuitry 13. The circuit 22 may be a transistor switch and operates to generate the FREQUENCY CONTROL signal whenever the batteries in the battery pack 14 become weak. For example, the circuit 22 may be set to generate the FREQUENCY CONTROL signal whenever the battery voltage level falls from its normal level of 27 volts to approximately 16 volts. In response to the FREQUENCY CONTROL signal, the tone generator 21 lowers its frequency of operation to an audio frequency noticeably or radically different from its selected base frequency, thereby to indicate that the batteries in the pack 14 are weak.

The busy signal processor 24 is connected to receive a BUSY SIGNAL generated by a telephone set called. The BUSY SIGNAL is transmitted to the processor 24 over the telephone lines 114 and through the transformer and relay circuit 23. The processor 24 operates in a conventional manner to generate a REDIAL CONTROL SIGNAL which indicates whether a BUSY SIGNAL has or has not been received, thereby to indicate whether the telephone set called is off-hook or on-hook. The redial decision circuit 25 operates in response to a REDIAL CONTROL SIGNAL indicating that the called telephone set is busy or off-hook to transmit the SYSTEM RESET signal to the voltage regulator 15. As before mentioned, the SYSTEM RESET signal briefly drives the regulator operating voltage output to zero to reset the apparatus 11 so that the telephone number called is redialed. It is noted that the apparatus 11 keeps recalling the telephone number as long as the telephone line called is busy.

The redial decision circuit 25 operates in response to a REDIAL CONTROL SIGNAL indicating that the called telephone set is available or on-hook to transmit the signal TIMER ENABLE to the activation switch and timer circuit 13 and an AMPLIFIER ENABLE signal to the amplifier 27. The amplifier 27 is enabled in response to the AMPLIFIER ENABLE signal and operates in conjunction with a microphone connected to the jack 26 to provide an audio surveillance of the area at which the alarm condition has occurred. Any noise at this area is picked up by a microphone connected to the jack 26, amplified by the amplifier 27 and transmitted via the transformer and relay circuit 23 over the telephone lines 114 to the receiver of the telephone set which has been called. As before-mentioned in response to the TIMER ENABLE signal, the circuit 13 generates a predetermined time delay, such as 90 seconds, and then deactivates to remove the B+ operating voltage from the apparatus 11 and shut the apparatus 11 down.

It is noted that a tape recorder containing precorded messages thereon or other suitable electrical devices could be connected to the input jack 26 instead of a microphone.

In operation of the alarm reporting apparatus 11, a TRIGGER INPUT representing the occurrence of an alarm condition or other selected event is received on the jack 12. The circuit 13 activates in response to the TRIGGER INPUT to enable the voltage regulator 15 and the regulator 15 when enabled activates the apparatus 11 by supplying B+ operating voltage thereto.

Upon receiving B+ voltage, the output relay contacts 115 shown in FIG. 5 close to present an off-hook signal to the telephone lines 114. The delay generator 20 generates an initial time delay to allow time to receive a dial tone and then enables the clock 18. The clock 18 commences generating clock pulses at its first rate, i.e., 10 pulses per second, to simultaneously pulse the relay contacts 115 to generate dial pulses and dial a telephone number digit and to drive the staircase generator 19 to generate the STAIRCASE VOLTAGE signal.

Referring for the moment to FIG. 3, the supply of B+ voltage to the comparators 17 causes the operational amplifiers 52-61 to initially turn on in a negative saturation state due to the capacitor 64 tied to the 12 volt power supply. Further, due to the diodes 87 connected between the amplifier outputs and noninverting inputs, each operational amplifier operates to clamp the following amplifier in this state of negative saturation.

In operation of the circuitry 17, the STAIRCASE VOLTAGE signal is simultaneously applied to all noninverting inputs of the operational amplifiers 52-61. The amplifier 52, which is the only one of the operational amplifiers not clamped by a diode 87, compares the DC voltage set by the selector switch 32 on the terminal 72 and changes to a positive saturation state the instant the STAIRCASE VOLTAGE exceeds the voltage on terminal 72. It is noted that if the selector switch 32 is set on position one that the STAIRCASE VOLTAGE level will exceed this voltage, as before mentioned, after one voltage step and further that one voltage step corresponds to one pulse of the clock 18 and one dial pulse. It is also noted that if the selector switch 32 is in its OFF position that the zero state voltage level of the STAIRCASE VOLTAGE signal exceeds the voltage on terminal 72 so that the amplifier 52 initially latches into positive saturation and is bypassed.

At the time the amplifier 52 goes from negative to positive saturation, a number of events simultaneously take place. The feedback diode 86- resistor 85 combination latches the amplifier 52 into positive saturation so that it may only be reset by removing the B+ operating voltage. The output signal of the amplifier 52 is coupled through the associated capacitor 89 to the bus 88 to generate the DIGIT COMPLETION signal, thereby to activate the interdigit delay generator 20 to stop the clock 18 and reset the staircase generator 19 to its zero state. Further, the diode 87 tied between the amplifiers 52 and 53 goes from a conductive to a nonconductive state, thereby to enable the next amplifier in sequence, i.e., the amplifier 53.

It is noted that the capacitors 63 tied between the amplifier output and the inverting input of the next amplifier is sequence, i.e., amplifier 53, functions to hold off momentarily the actuation of the amplifier 53 during the time the STAIRCASE VOLTAGE signal is reset to its zero state.

The interdigit delay generator 20 now generates a time delay to provide a predetermined time delay between dialed telephone number digits. Once the time delay has been generated, the delay generator 20 again enables the clock 18. The telephone number digits set on selector switches 33-41 are then sequentially dialed in the manner above described by using the telephone number comparators defined by the operational amplifiers 53-59.

Upon dialing the last telephone number digit, the operational amplifier 59 is switched to its positive saturation state. Thereby, the code comparator provided by the amplifier 60 is enabled, the END OF DIAL signal is generated on the bus 68, and the DIGIT COMPLETION signal is generated on the bus 88. The delay generator 20 generates a time delay in response to the DIGIT COMPLETION signal, as above described, and the clock 18 switches to its second slower rate, i.e., 2 pulses per second, in response to the END OF DIAL signal. The END OF DIAL signal also latches the output relay contacts 115 shown in FIG. 5 closed in an off-hook condition.

The code comparators provided by the amplifiers 60 and 61 in conjunction with the clock 18 now operate in a manner similar to the aforedescribed dialing comparators provided by the amplifiers 52-59 to generate a coded easily identifiable alarm signal at the slower two pulse per second rate. The CODED ALARM signal is generated by turning the code tone generator 21 on and off in time correspondence with the pulses of the clock 18. The tone generator 21 is turned on and off in response to the CODE ENABLE signal from the clock 18 which signal is generated in time correspondence with the STAIRCASE DRIVE signal. It is noted that once the code comparators provided by the amplifiers 60 and 61 are enabled that they continuously recycle via the feedback loop provided by the transistor pair 65 until the apparatus 11 is deactivated.

The CODED ALARM signal is transmitted to the called telephone lines by being coupled thereto through the transformer 111 and the telephone lines 114. If the telephone set called is not busy and has been answered by a person at the telephone number called, the person answering will hear the CODED ALARM signal. Further, the apparatus 11 will enable the amplifier 27 so that if a microphone is connected to the jack 26 audio surveillance is provided of the area whereat the alarm condition has occurred. The TIMER ENABLE signal is generated by the redial decision circuit 25 at the time the amplifier 27 is enabled to enable the timer circuit in the circuitry 13 so that the apparatus 11 automatically turns itself off after a predetermined time period, such as 90 seconds.

If the telephone number called is busy, the busy signal processor 24 receives a BUSY SIGNAL to trigger the redial decision circuit 25 to cause a SYSTEM RESET signal to be generated. In response to the SYSTEM RESET signal, the B+ operating voltage is momentarily driven to zero volts, thereby to reset the apparatus 11 and in particular all of the comparator stages provided by the operational amplifiers 52-61. Thus, the apparatus 11 once activated continues to automatically replace the telephone call to the number being called as long as the telephone set associated with the telephone number is off-hook or busy.

Thus, an improved alarm reporting system has been provided.

We claim:

1. Apparatus for telephonically reporting the occurrence of a selected event, such as an alarm condition, comprising:

input terminal means for receiving a trigger signal representing the occurrence of said selected event;

output terminal means for connection to a set of telephone lines;

means for supply operating voltage, said voltage supply means being responsive to and enabled by said trigger signal to supply operating voltage, said voltage supply means comprising battery means for supplying the operating voltage and including means for sensing the level of the operating voltage supplied and generating a frequency control signal whenever the operating voltage falls below a predetermined level;

means connected to said output terminal means for dialing when activated a selected telephone number by generating dial pulses on a set of telephone lines connected to said output terminal means, said dialing means receiving its operating voltage from said voltage supply means to activate when said voltage supply means enables, said dialing means being operable to generate an end of dial signal to indicate that said telephone number has been dialed; and means connected to said output terminal means for generating in response to said end of dial signal and audio alarm signal on a set of telephone lines connected to said output terminal means, said alarm signal generating means also being responsive to said frequency control signal indicating the fall of the operating voltage below said predetermined level to noticeably shift the tone of the audio alarm signal generated to indicate when said battery means are weak.

2. The invention defined in claim 1, wherein said alarm signal generating means is operable to generate a coded alarm signal.

3. The invention defined in claim 2, including selector switch means for selectively setting said telephone number dialed and the code of said alarm signal.

4. The invention defined in claim 2, wherein:

said dialing means is operable to generage dial pulses at a first pulse rate; and said alarm signal generating means is operable to code said alarm signal at a second pulse rate lower than said first pulse rate, said second pulse rate being readily detectable by the human ear.

5. Apparatus for telephonically reporting the occurrence of a selected event, such as an alarm condition, comprising:

input terminal means for receiving a trigger signal representing the occurrence of said selected event;

output terminal means for connection to a set of telephone lines;

means for supplying operating voltage, said voltage supply means being responsive to and enabled by said trigger signal to supply operating voltage;

means connected to said output terminal means for dialing when activated a selected telephone number by generating dial pulses on a set of telephone lines connected to said output terminal means, said dialing means receiving its operating voltage from said voltage supply means to activate when said voltage supply means enables, said dialing means being operable to generate an end of dial signal to indicate that said telephone number has been dialed;

means connected to said output terminal means for generating in response to said end of dial signal an audio alarm signal on a set of telephone lines connected to said output terminal means;

means connected to said output terminal means for detecting a telephone busy signal received on a set of telephone lines connected to said output terminal means, said busy signal detection means being operable in the presence of a busy signal to generate a system reset signal and being operable in the absence of a busy signal to generate a timer enable system, said voltage supply means being responsive to said system reset signal to interrupt supplying operating voltage to said dialing means, said dialing means being operable to reset for redialing said telephone number whenever its supply of operating voltage is cut off; and, timer means responsive to said timer enable signal for disabling said voltage supply means a predetermined period of time after the generation of said timer enable signal to deactivate said apparatus.

6. The invention defined in claim 5, wherein said busy signal detection means is operable to generate an amplifier enable signal simultaneous with said timer enable signal; and including:

second input terminal means for connection to a microphone;

means connected between said output terminal means and said second input terminal means for amplifying audio signals received on said second input terminal means and transmitting them to a set of telephone lines connected to said output terminal means, said amplifying means being responsive to and enabled by said amplifier enable signal.

7. Apparatus for telephonically reporting the occurrence of a selected event, such as an alarm condition, comprising:

input terminal means for receiving a trigger signal representing the occurrence of said selected event;

output terminal means for connection to a set of telephone lines;

means for supplying operating voltage, said voltage supply means being responsive to and enabled by said trigger signal to supply operating voltage;

means connected to said output terminal means for dialing when activated a selected telephone number by generating dial pulses on a set of telephone lines connected to said output terminal means, said dialing means receiving its operating voltage from said voltage supply means to activate when said voltage supply means enables, said dialing means being operable to generate an end of dial signal to indicate that said telephone number has been dialed;

said dialing means comprising: selector switch means for establishing a plurality of DC voltage signals representing the digits of said selected telephone number; clock means for generating when enabled clock pulses at a first selected rate; means for generating a staircase voltage, said staircase voltage generating means being selectively resettable to a zero state and responsive to said clock pulses to generate said staircase voltage; voltage comparator means for sequentially comparing said DC voltage signals with said staircase voltage, said comparator means being operable to generate a digit completion signal whenever said staircase voltage signal exceeds the one of said DC voltages with which it is being sequentially compared; means for generating a time delay, said delay generating means being responsive to said digit completion signal to transmit a staircase reset signal to said staircase voltage generating means to reset it, said delay generating means also being operable in response to said digit completion signal to transmit a clock enable signal to said clock means to enable it a selected period of time after the generation of said staircase reset signal thereby to generate a time delay; and means responsive to said clock pulses for generating dial pulses on a set of telephone lines connected to said output terminal means; and means connected to said output terminal means for generating in response to said end of dial signal an audio alarm signal on a set of telephone lines connected to said output terminal means.

8. The invention defined in claim 7, wherein said dial pulse generating means include relay means which open and close in response to said clock pulses, the opening and closing of said relay means being operable to generate said dial pulses.

9. Apparatus for telephonically reporting the occurrence of a selected event, such as an alarm condition, comprising:

input terminal means for receiving a trigger signal representing the occurrence of said selected event;

output terminal means for connection to a set of telephone lines;

means for supplying operating voltage, said voltage supply means being responsive to and enabled by said trigger signal to supply operating voltage;

means connected to said output terminal means for dialing when activated a selected telephone number by generating dial pulses on a set of telephone lines connected to said output terminal means, said dialing means receiving its operating voltage from said voltage supply means to activate when said voltage supply means enables, said dialing means being operable to generate an end of dial signal to indicate that said telephone number has been dialed;

said dialing means comprising: selector switch means for establishing a plurality of DC voltage signals representing the digits of said selected telephone number; clock means for generating when enabled clock pulses at a first selected rate; means for generating a staircase voltage, said staircase voltage generating means being selectively resettable to a zero state and responsive to said clock pulses to generate said staircase voltage; voltage comparator means comprising a plurality of operational amplifiers connected in a chain for sequentially comparing each of said DC voltages with said staircase voltage, said comparator means being operable to generate a digit completion signal whenever said staircase voltage signal exceeds the one of said DC voltages with which it is being sequentially compared; means for generating a time delay, said delay generating means being responsive to said digit completion signal to transmit a staircase reset signal to said staircase voltage generating means to reset it, said delay generating means also being operable in response to said digit completion signal to transmit a clock enable signal to said clock means to enable it a selected period of time after the generation of said staircase reset signal thereby to generate a time delay; and means responsive to said clock pulses for generating dial pulses on a set of telephone lines connected to said output terminal means, said dial pulse generating means including relay means which open and close in response to said clock pulses, the opening and closing of said relay means being operable to generate said dial pulses; and, means connected to said output terminal means for generating in response to said end of dial signal an audio alarm signal on a set of telephone lines connected to said output terminal means.

10. The invention defined in claim 9, wherein said alarm signal generating means is operable to generate a coded alarm signal and said selector switch means is also operable to selectively establish DC voltages to set the code of said alarm signal.

11. The invention defined in claim 10, wherein:

the code of said alarm signal is generated by said voltage comparator means;

said clock means is responsive to said end of dial signal to generate clock pulses at a second selected rate lower than said first selected rate;

said alarm signal generating means includes a tone generator means for generating an audible tone at a predetermined frequency, said tone generator means being enabled by said clock pulses at said second selected rate to generate said coded alarm signal; and said alarm signal generating means includes means for coupling said tone generator means to said output terminal means to transmit said coded alarm signal thereto.

12. The invention defined in claim 11 wherein said means for coupling said tone generator means to said output terminal means is transformer means.

13. The invention defined in claim 11, wherein said voltage supply means comprises battery means for supplying the operating voltage and including means for sensing the level of the operating voltage supplied and generating a frequency control signal whenever the operating voltage falls below a predetermined level, said tone generator means being responsive to said frequency control signal to noticeably change the frequency of the audible tone being generated.

14. Apparatus for telephonically reporting the occurrence of a selected event, such as an alarm condition, comprising:

input terminal means for receiving a trigger signal representing the occurrence of said selected event;

output terminal means for connection to a set of telephone lines;

means for supplying operating voltage, said voltage supply means being responsive to and enabled by said trigger signal supply operating voltage;

means connected to said output terminal means for dialing when activated a selected telephone number by generating dial pulses on a set of telephone lines connected to said output terminal means, said dialing means receiving its operating voltage from said voltage supply means to activate when said voltage supply means enables, said dialing means being operable to generate an end of dial signal to indicate that said telephone number has been dialed;

means connected to said output terminal means for generating in response to said end of dial signal an audio alarm signal on a set of telephone lines connected to said output terminal means; and means for detecting a telephone busy signal received on a set of telephone lines connected to said output terminal means and interrupting the supply of operating voltage to said apparatus in response to the detection of a telephone busy signal, said apparatus being operable to reset for redialing said telephone number whenever its supply of operating voltage is cut off.

15. The invention defined in claim 14, including means for latching said voltage supply means in its enabled state and wherein said busy signal detection means is operable to generate a timer enable signal if a telephone busy signal is not detected, and including timer means responsive to said timer enable signal for disabling said voltage supply means after a selected time delay to deactivate said apparatus.

* * * * *